Sept. 30, 1947.    H. W. COLLINS    2,428,325
REINFORCED PLYWOOD
Filed Oct. 30, 1942
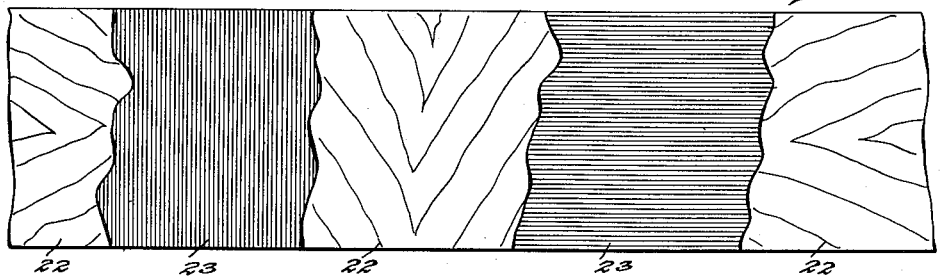
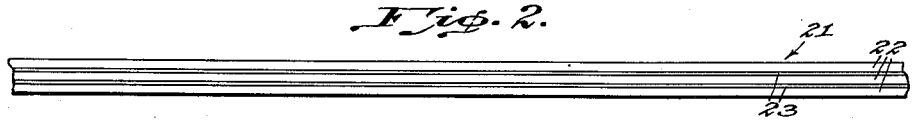
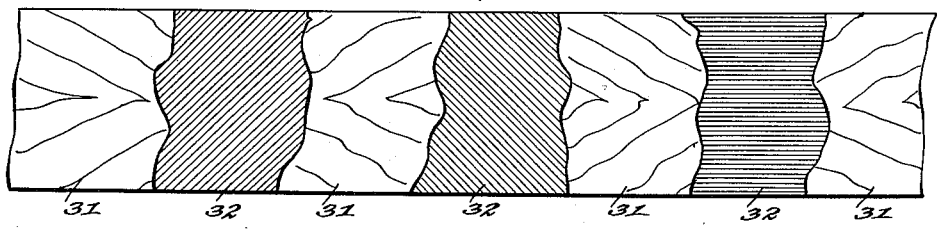
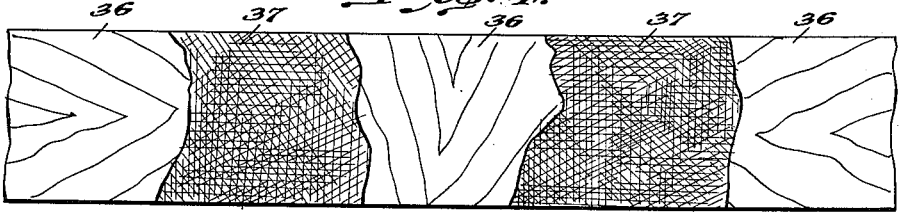
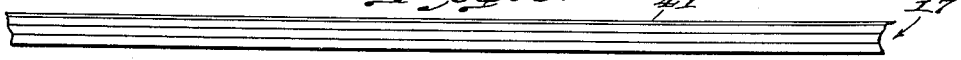
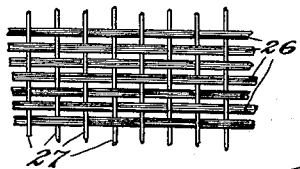
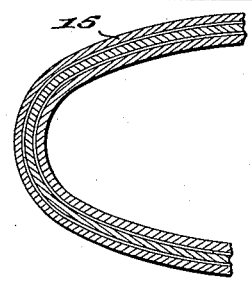
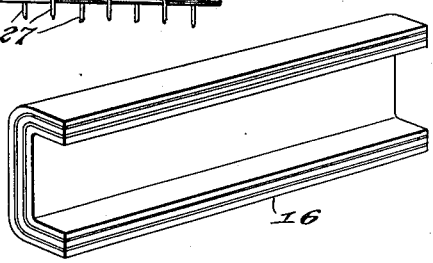
Inventor
HOWARD W. COLLINS
By Stachin + Overman
Attorneys Patented Sept. 30, 1947

2,428,325

UNITED STATES PATENT OFFICE 2,428,325

REINFORCED PLYWOOD

Howard W. Collins, Newark, Ohio, assignor to Owens-Corning Fiberglas Corporation, a corporation of Delaware Application October 30, 1942, Serial No. 464,147

2 Claims. (Cl. 154—45.9)

This invention relates to laminated structural materials such as plywood and particularly to plywood constructions suitable for use in place of metal.

Laminated wood has a high strength-weight ratio which is better than that of metal and even the light metal alloys. The material has very desirable properties of lightness, ready availability, ease in working whether cutting or molding, and, when bonded and treated with phenolic or the like resins, is water-resistant to high degree. However, the use of wood laminates as structural material has been heretofore sharply restricted by the unreliability of plywood due to the changes in dimensions of the material with changes in moisture content of the wood brought about by atmospheric and other conditions.

Previously there has been no fully successful way of preventing change in dimensions of plywood without detracting from the desirable strength-weight ratio of the material. Reinforcing the plywood by means of metal members, for instance, decreases the strength-weight ratio.

One of the principal objects of this invention is to reinforce plywood against change in dimensions with varying moisture content while maintaining or, if desired, even increasing the strength-weight ratio of plywood materials and without appreciably increasing the thickness or impairing the molding or working characteristics of such materials. Other characteristics of plywood, such as flexibility, may be retained or varied as desired to suit the use to be made of the finished material.

In accordance with this invention, plywood material having all these improved properties is produced by combining thin sheets or layers of strong, substantially non-stretchable fibers with the wood plies or boards and by bonding the plies and fibrous sheets together to form an integral unit.

Another object of this invention is to reinforce plywood with alternate layers of glass fibers which may be in the form of a woven cloth, a mat of fibers, a sheet of parallelly arranged glass fibers, strands or yarns.

It is a further object of the present invention to employ reinforcing glass fibers of a type that are extremely well suited to the production of plywood of greatly increased stability and strength.

Another object of the invention is to employ webs or fabrics in which glass fibers, or strands or yarns of glass fibers, extend substantially in parallel and in the direction in which change in dimensions of the plywood is to be prevented; and, further, to pre-stress the glass fibers so that the minimum dimensional variation and the maximum strength of the composite material may be realized.

A further object of this invention is to provide a plywood product displaying permanency in dimensions and maximum strength in several directions by having alternate plies of wood and layers of glass fibers arranged in such a manner that the fibers of one glass fiber layer extend in a different direction than the fibers of an adjacent glass fiber layer.

Still another object of this invention is to provide composite plywood of the type set forth wherein glass fibers are arranged at random so that the fibers extend in many different directions. This represents a very inexpensive way to decrease the dimensional variation of the plywood although it usually cannot be depended upon to provide maximum results.

A still further object of this invention is to provide a glass fiber facing on an exposed surface of a plywood object in such a manner that the facing not only imparts stability to the plywood but, in addition, protects the surface against abrasion and fire; and, further, to apply the facing in such a manner that the natural grain and appearance of the wood is not obscured. It has also been found that a facing layer of matted or woven glass fibers improves the paint-taking characteristics over those of wood surfaces.

The foregoing, as well as other objects, will be made more apparent as this description proceeds especially when considered in connection with the accompanying drawings, wherein:

Figure 1 is a plan view of a sheet of plywood made in accordance with this invention and having certain parts broken away;

Figure 2 is a side elevational view of the plywood sheet shown in Figure 1;

Figure 3 is a plan view of a slightly modified form of the invention and also having certain parts broken away for the sake of clearness;

Figure 4 is a plan view of still another embodiment of this invention and having certain parts broken away to show the different laminations of the plywood material;

Figure 5 is a side elevational view of a further modification of this invention;

Figure 6 is a diagrammatic elevational view of the reinforcing fabric preferably employed in the invention;

Figure 7 is a sectional view showing one application of plywood material constructed in accordance with this invention; and Figure 8 is a perspective view showing another application of the plywood material of the present invention.

In general the invention in its various forms shown in the drawings comprises plywood material having plies of wood combined with relatively thin layers of glass fibers in the form of a woven cloth, a mat of fibers, a sheet of parallelly arranged glass fibers, strands or yarns. Glass fibers in any one of the above or other forms are preferred because the individual fibers possess considerable tensile strength coupled with very low stretch and are capable of being produced in such small diameters that they form a very thin layer or sheet. Moreover, glass fibers may be manufactured on a production basis at a low cost and they also lend themselves readily to molding operations employed in forming plywood materials to different contours or shapes.

The wood layers are preferably in the form of thin sheets of wood of desired kind suitably coated, treated or impregnated with an adhesive selected to unite the layers under the action of heat and/or pressure. In accordance with conventional practice, the wood layers may be treated or impregnated with a bonding material such, for example, as casein glue, or with a thermosetting resin such as a phenol formaldehyde or other phenolic resin. The particular wood employed and its treatment are not critical to this invention, and may vary over a wide range without affecting the scope or advantages of this invention.

The reinforcing sheets of glass fibers may take the form of woven cloth, a mat of fibers, a sheet of parallelly arranged glass fibers, strands, or yarns. Regardless of their particular arrangement, the glass fibers are inserted between adjacent wood layers and are permanently secured to the layers to form an integral unit by applying heat and/or pressure to the plywood material. The sheets of glass fibers are first preferably impregnated with an adhesive or bonding material that is the same as or compatible with the bonding material applied to the wood layers.

All the glass fibers throughout the plywood structure may extend in the same, or in different directions, to impart the required strength characteristics to the plywood material. It is also important to note that regardless of the particular arrangement of the glass fibers, they do not appreciably increase the thickness of the plywood material and this is extremely important in cases where the plywood material is substituted for thin gauge sheet metal. Moreover, due to the characteristics of the glass fibers, it is possible to mold or otherwise form the plywood material to various different contours, as evidenced by the illustrations of Figure 7 wherein a plywood sheet, reinforced with glass fibers, is shown as shaped to form a nose section 15 of an aircraft, and that of Figure 8 showing a structural channel 16 of molded reinforced plywood.

With the above in view, reference is now made to Figures 1 and 2 of the drawings wherein a 5-ply sheet of material 21 is shown. In detail the sheet 21 comprises alternate laminations of wood 22 and glass fibers 23 integrally united by bonding material previously applied to the laminations. The glass fibers inherently possess substantial tensile strength and serve to appreciably reinforce the plywood material regardless of how they are arranged. However, in some applications of the material it may be desirable to reinforce the plywood material so that it may resist greater tensile stresses and display less dimensional variation in two or more directions extending transversely of one another. This is accomplished by arranging the glass fibers of each layer 23 substantially parallel to one another and arranging the fibers of one lamination at approximately right angles to the glass fibers of an adjacent lamination. The strength of the plywood material may further be increased in both of these directions by placing alternate wood layers with the length of the grain extending in the same general direction as the glass fibers.

It has been found that extremely favorable results are obtained if glass fibers of a particular type and in special arrangement are employed as the reinforcing layer. Glass fibers of the continuous type have great tensile strength and may be caused to extend substantially continuously throughout the length or width of a reinforced product so that full advantage may be taken of the strength in tension of each fiber of the reinforcing layer. Continuous type glass fibers are those made by continuously attenuating a stream of molten glass and winding a plurality of the attenuated fibers as a strand on a rotating spool or drum. The individual fibers extend continuously throughout any portion of strand up to many hundreds of feet and more in length.

Glass fibers have negligible stretch when used in plywood structures, whereas natural or synthetic organic fibers have such a high degree of stretch that plywood cannot be satisfactorily reinforced with such fibrous material. Further, most natural organic fibers and inorganic fibers other than glass, for instance, asbestos, are of relatively short lengths and yarns of such fibers must be highly twisted to develop ample tensile strength in the yarn. The high twist in itself imparts stretchability to the yarn so that the full strength of the yarn cannot be utilized in plywood structures. On the other hand, continuous glass fibers may be used as untwisted or only slightly twisted strands since twist need not be depended upon to give strength to the strand. There is thus no or negligible stretch in the strands which, coupled with the negligible stretch of the fibers themselves, offers the best means of reinforcing.

It has been discovered that much better results are obtained in production and in the product if a special type of fabric of glass fibers is employed as the reinforcing layer. This fabric is illustrated diagrammatically in Figure 6 of the drawings. The fabric shown is woven of strands or yarns 26 of continuous type glass fibers extending in one direction, preferably as the warp. Crossing yarns 27 are preferably of cotton or other organic material and are spaced apart three to six times the diameter of the glass yarns. These cotton yarns are provided mainly to hold the glass yarns in parallel side-by-side relation and are not depended upon for any reinforcement. They are preferably of relatively small diameter, being one-half to one-fourth the diameter of the glass fiber yarns or even smaller if desired. The purpose of small crossing yarns widely spaced is to permit the glass fiber yarns to extend in substantially straight lines without the undulations that would result if they were interwoven with larger crossing yarns or with crossing yarns more closely spaced. The arrangement of the glass fiber yarns in substantially straight lines in planes normal to the face of the fabric assures that the reinforcing load is carried by the yarns in the most efficient manner. The crossing yarns 27 may also be of glass if desired, but results are usually better if these yarns are of cotton or other organic materials.

Arrangement of the reinforcing strands or yarns in straight lines is enhanced if a relatively low tension is placed on the fabric while it is being bonded between the wood plies. This tension straightens out the glass fiber yarns, causing all the yarns to locate in the same plane. The small crossing yarns enhance ability of the reinforcing yarns to do this.

The glass yarns 26 may be of any desired construction but usually a medium size yarn is best. These yarns may be either single or multi-ply but should have relatively low twist. Yarns of continuous glass fibers twisted about two and one-half turns per inch have been found to give the highest reinforcing strength coupled with sufficient integrity of the yarns to permit ready handling in weaving. This low twist not only results in negligible stretch of the reinforcing yarns but also permits more ready penetration of the bonding resin into the interior of the yarn when the fabric is impregnated and when the wood and fabric layers are cemented together.

Maximum reinforcing strength in any direction may be achieved by arranging fabrics of the type shown in Figure 6 so that the glass yarns extend in the direction of highest stress. Two or more fabrics in the same reinforcing layer or in different layers may be arranged with the glass yarns crossing at required angles to attain high resistance to stresses in more than one direction.

Considerable increase in dimensional permanency and increase in the load-bearing properties of the reinforced plywood of the present invention are realized if the fabric reinforcing layer is pre-stressed. This may be done by placing the reinforcing fabric under relatively high tension by suitable means during the time the reinforcing and the wood layers are being united. When bonding of the reinforced plywood is completed and the tension on the reinforcing fabric relaxed, the wood layers are placed under compression to a certain extent by the reinforcing layers so that the permanency and strength of the finished product is correspondingly increased.

In Figure 3 of the drawings a 7-ply sheet of material is shown. This sheet of material comprises alternate laminations 31 of wood and laminations 32 of glass fibers. The glass fibers of alternate laminations 32 are angularly disposed with respect to each other and cooperate to stabilize the plywood material in any one of a number of different directions. In this embodiment of the invention, alternate wood laminations 31 have opposed grain directions, although it is to be understood that the invention is not limited to any specific arrangement of the wood layers.

The embodiment of the invention shown in Figure 4 illustrates a 5-ply sheet of material also having alternate laminations of wood 36 and glass fibers 37. In this embodiment of the invention the glass fiber laminations are in the form of mats or webs having irregularly arranged fibers. In other words, the fibers in each lamination extend in many different directions and cooperate to stabilize the plywood material in practically any direction. However, due to the crossing of the fibers and their irregular arrangement, the degree of reinforcing and therefore the permanency is less than that obtained with the preferred arrangement of the fibers in the above-described fabric.

The embodiment of the invention shown in Figure 5 differs from the above modifications in that the alternate glass fiber laminations are omitted and a protecting layer 41 of glass fiber fabric is applied to one surface of the material. The layer 41 may be either in the form of a mat of glass fibers or a sheet of parallelly arranged glass fibers, strands or yarns, but is preferably a woven fabric. The layer 41 is permanently united to the plywood material by a bonding material, such as a thermosetting resin, by the application of heat and/or pressure, preferably during the time the wood layers are united together. This construction results in providing a wear-resistant surface on one face of the plywood material, and protects the plywood from severe abrasion. It provides a fire-resistant surface and a surface with improved paint-taking characteristics in that the surface may be fully covered with a thinner paint film.

Where the plywood is veneered, and the outer surface layer of glass fibers is applied over the veneer, it has been found possible to render the layer of fibers invisible or transparent and thereby prevent obscuring the appearance of the veneer. This is accomplished by employing as the resin or other material that serves to bond the fibrous covering layer to the plywood, a material whose index of refraction is the same as the index of refraction of the glass fibers of the covering layer.

Although Figure 5 of the drawings does not show reinforcing layers of glass fibers alternating with the plies of wood, nevertheless it will be apparent that this construction may also be employed in combination with the protecting layer 41 of glass fibers. In other words, this invention contemplates applying the protecting layer of glass fibers to any one or all of the embodiments shown in Figures 1 to 4, inclusive.

Layers of glass fibers may be arranged between all the plies or between two of the plies depending upon the degree of stability and strength required in the composite material. The particular location of the glass fiber layer may also be varied to increase the rigidity of the reinforced plywood or to retain the flexibility found in usual plywood material. For instance, if increased rigidity is desired, the reinforcing layer of glass fibers may be located as far as possible from the neutral axis of the plywood and on that side of the neutral axis that will be placed under tension when the plywood is stressed by the application of forces thereto in a direction transverse to its major surfaces. By the same principle, the flexibility will remain substantially unaltered if the reinforcing layer of glass fibers is placed as close as possible to the neutral axis.

As an example of the improvement obtained by the present invention, the following table gives the results of tests comparing the strength of plywood reinforced with glass fibers with various other materials:

| | Specific Gravity | Yield Point in Tension, lbs./sq. in. | Strength in lbs./sq. in., Specific Gravity |
|---|---|---|---|
| High-Density Plywood | 0.8–1.3 | None | 24,700 |
| Low Carbon Steel | 7.75 | 36,000 | 4,600 |
| High Carbon Steel | 7.83 | 75,000 | 9,500 |
| Magnesium Alloy | 1.78 | 23,000 | 12,900 |
| Plywood Reinforced with Glass Fibers | 1.5 | 64,000 to 128,000 | 40,000 to 80,000 |

The term "wood" as used herein includes all material of the basic nature of wood such as impregnated and compressed wood, and wood fibers compressed and bonded to form dense sheets having many of the properties of wood but devoid of grain.

Various modifications of the invention may be made within the scope of the claims.

I claim:

1. As an article of manufacture, a reinforced plywood member comprising a plurality of plies of wood and at least one layer of fibrous material all bonded together in superposed relation by an adhesive substance, said fibrous material being in the form of parallelly arranged strands each composed of a multiplicity of glass fibers closely associated together in the strand, substantially all of the individual fibers extending continuously throughout the length of the individual strand, with substantially all the individual parallelly arranged strands extending substantially continuously through a major dimension of the reinforced plywood member to resist stresses therein.

2. As an article of manufacture, a reinforced plywood member comprising a plurality of superposed plies of wood and at least one layer of fibrous material covering a major face of the assembled wood plies and all bonded together by an adhesive substance, the fibrous layer being composed of parallelly arranged strands each composed of a multiplicity of glass fibers closely associated together in the strand with the individual fibers extending substantially continuously through the length of the individual strand.

HOWARD W. COLLINS.

REFERENCES CITED

The following references are of record in the file of this patent:

UNITED STATES PATENTS

| Number | Name | Date |
|---|---|---|
| 2,133,183 | Baird et al. | Oct. 11, 1938 |
| 2,202,013 | Lougheed | May 28, 1940 |
| 2,205,600 | Payzant | June 25, 1940 |
| 2,175,226 | Slayter | Oct. 10, 1939 |
| 2,015,006 | Ekisler | Sept. 17, 1935 |
| 2,312,227 | Yant | Feb. 23, 1943 |
| 1,771,216 | Gossler | July 22, 1930 |
| 1,891,430 | Loetscher | Dec. 20, 1932 |
| 2,065,045 | Broback et al. | Dec. 22, 1936 |
| 2,314,701 | Harvey | Mar. 23, 1943 |
| 2,133,238 | Slayter et al. | Oct. 11, 1938 |
| 2,070,527 | Elmendorf | Feb. 9, 1937 |
| 232,122 | Hammesfahr | Sept. 14, 1880 |
| 1,299,747 | McClain | Apr. 8, 1919 |
| 2,293,246 | Fay | Aug. 18, 1942 |

FOREIGN PATENTS

| Number | Country | Date |
|---|---|---|
| 23,995 | Great Britain | A. D. 1903 |
| 504,096 | Great Britain | Apr. 19, 1939 |